(12) United States Patent
Grinshpun et al.

(10) Patent No.: US 8,949,440 B2
(45) Date of Patent: Feb. 3, 2015

(54) SYSTEM AND METHOD FOR ADAPTIVE RATE DETERMINATION IN MOBILE VIDEO STREAMING

(75) Inventors: Edward Grinshpun, Freehold, NJ (US); David Faucher, Guthrie Center, IA (US); Koon Wah Yick, Howell, NJ (US); Sameerkumar Sharma, Holmdel, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 259 days.

(21) Appl. No.: 13/553,751

(22) Filed: Jul. 19, 2012

(65) Prior Publication Data

US 2014/0025830 A1    Jan. 23, 2014

(51) Int. Cl.
*G06F 15/16*    (2006.01)
*H04L 5/00*    (2006.01)
*H04N 21/24*    (2011.01)

(52) U.S. Cl.
CPC .......... *H04L 5/0064* (2013.01); *H04N 21/2402* (2013.01)
USPC ...................................... 709/227

(58) Field of Classification Search
CPC ... H04L 1/0002; H04L 1/1838; H04L 1/1877; H04L 29/06469; H04L 65/4092; H04L 29/06476; H04L 29/06517; H04L 5/0064; H04L 41/0896; H04L 2012/6456; H04N 21/2401; H04N 21/2402; H04N 21/26216; H04N 21/44209

See application file for complete search history.

(56) References Cited

U.S. PATENT DOCUMENTS

| | | | |
|---|---|---|---|
| 2011/0149087 A1* | 6/2011 | Jeong et al. | 348/207.1 |
| 2011/0239078 A1* | 9/2011 | Luby et al. | 714/752 |
| 2012/0195369 A1* | 8/2012 | Guerrero | 375/240.02 |
| 2012/0324123 A1* | 12/2012 | Fox et al. | 709/231 |
| 2013/0138828 A1* | 5/2013 | Strasman et al. | 709/231 |
| 2013/0155866 A1* | 6/2013 | Sun et al. | 370/241 |
| 2013/0191508 A1* | 7/2013 | Strasman et al. | 709/219 |
| 2013/0232534 A1* | 9/2013 | Salkintzis et al. | 725/116 |
| 2013/0243075 A1* | 9/2013 | Dalela et al. | 375/240.01 |

* cited by examiner

*Primary Examiner* — Krisna Lim
(74) *Attorney, Agent, or Firm* — Wall & Tong, LLP

(57) ABSTRACT

A system, method and apparatus to dynamically tune parameters impacting bitrate selection to control thereby client bandwidth usage are described. Controlling client bandwidth usage can be performed by instantiating an adaptive rate determining algorithm (A-RDA) function associated with a mobile client, where this A-RDA function being responsive to a rate control profile and client channel information (e.g., channel condition information) to select for said client available content segments having an appropriate bit-rate.

22 Claims, 8 Drawing Sheets

SYSTEM AND METHOD FOR ADAPTIVE RATE DETERMINATION IN MOBILE VIDEO STREAMING

FIELD OF THE INVENTION

The invention relates generally to communication networks and, more specifically but not exclusively, to computation of data rate criteria in communication networks having link constraints.

BACKGROUND

HTTP Adaptive Streaming (HAS) technology supports streaming pre-encoded video content to client devices such as home computers, tablets, mobile devices and the like. Mobile HAS traffic typically utilizes wireless Best Effort Data connections along with application layer signaling between a HAS client on the mobile device and HAS server to match the video bitrate encoding with the client estimated available bandwidth.

HAS technology is proven to work well over broadband wireline connections with reasonably stable throughput and plenty of bandwidth to spare. Unfortunately, HAS technology is not well suited for mobile video sessions due to fast changing wireless channel conditions and limited bandwidth resources of shared over-the-air links.

From the end user perspective, mobile HAS delivers uneven and inconsistent mobile video quality across multiple end users and within the scope of a single video session. From the Wireless Service Provider (WSP) perspective, mobile HAS tends to overload WSP network (thus reducing the number of HAS users that can be served) without any possibility for the WSP to control, manage or monetize the load, since the decisions regarding the video bitrate that directly affect the corresponding WSP network load are done at the application level without knowledge of wireless channel conditions.

There are two industry approaches to solve this problem; namely, customized application layer Rate Determination Algorithms (RDAs) and WSP rate shaping of HAS traffic. Unfortunately, each of these approaches has proved inadequate for various reasons.

SUMMARY

Various deficiencies in the prior art are addressed by systems, methods and apparatus to dynamically tune parameters impacting bitrate selection to control client bandwidth usage.

One embodiment comprises a method for controlling client bandwidth usage comprising instantiating an adaptive rate determining algorithm (A-RDA) function associated with a mobile client, said A-RDA function being responsive to a rate control profile and client channel information to select for said client available content segments having an appropriate bitrate.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be primarily discussed within the context of HTTP Adaptive Streaming (HAS) and Dynamic Adaptive Streaming over HTTP (DASH), though other protocols or streaming media technologies may also be employed within the context of the various embodiments, such as Real Time Transport Protocol (RTP), Real Time Streaming Protocol (RTSP) and so on.

Further, while primarily discussed within the context of streaming media via a Long Term Evolution (LTE) network, those skilled in the art and informed by the teachings herein will realize that the invention is also well suited for use with other types of wireless networks (e.g., 3G networks, 2G networks, WiMAX, 802.11x and so on.), wireline networks or combinations of wireless and wireline networks. Thus, the various connectors, sites, nodes, network elements and so on discussed herein with respect to LTE embodiments may also be considered as being discussed with respect to similar elements in other network embodiments (e.g., eNodeB in LTE or 4G network similar to Base Station in 3G network, etc.).

In various embodiments, an Adaptive Rate Determination Algorithm (A-RDA) and/or Proxy function suitable for use in streaming multimedia over computer networks is provided. In various embodiments, per-client instances of applications controlled by the Wireless Service Provider are provided. In various embodiments, the A-RDA is logically disposed between a streaming media client (e.g., a HAS client) and a streaming media server (e.g., a HAS server). In various embodiments, the A-RDA utilizes standard DASH interface when performing HAS Server functions with respect to the HAS client, and HAS client functions with respect to the HAS server. A-RDA instances may be controlled by a HAS Session manager function to adapt each A-RDA instance behavior based upon the dynamic wireless service provider's policies on a per-mobile client granularity, taking into account wireless channel conditions, network state (e.g. congestion) and/ or other available access network information.

Figure 1:
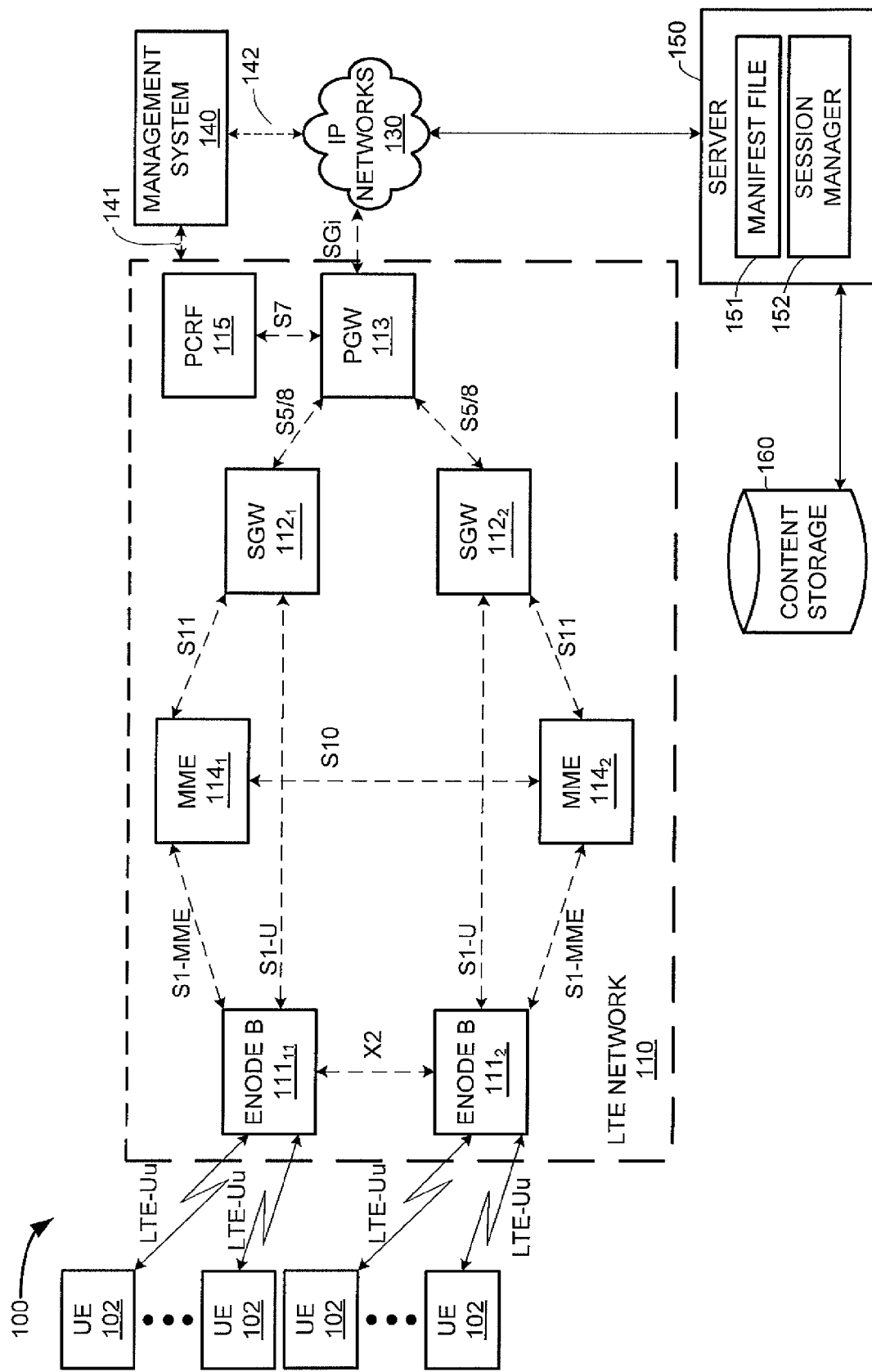
FIG. 1 depicts an exemplary wireless communication system supporting various embodiments.

FIG. 1 depicts an exemplary wireless communication system supporting various embodiments. Specifically, FIG. 1 depicts an exemplary wireless communication system 100 that includes a plurality of User Devices (UDs) or User Equipment (UEs) 102, a Long Term Evolution (LTE) network 110, IP networks 130, a management system (MS) 140, a content server 150 and a content storage device 160.

The LTE network 110 supports communications between the UEs 102 and IP networks 130, such as communications for initiating content streaming sessions between the content server 150 and UEs 102. The MS 140 is configured for supporting various management functions for LTE network 110.

The UEs 102 are wireless user devices capable of accessing a wireless network, such as LTE network 110. The UEs 102 are capable of supporting control signaling in support of the bearer session(s). The UEs 102 may be a phone, PDA, computer, or any other wireless user device.

The configuration and operation of LTE networks will be understood by one skilled in the art. The exemplary LTE network 110 includes two eNodeBs $111_1$ and $111_2$ (collectively, eNodeBs 111), two Serving Gateways (SGWs) $112_1$ and $112_2$ (collectively, SGWs 112), a Packet Data Network (PDN) Gateway (PGW) 113, two Mobility Management Entities (MMEs) $114_1$ and $114_2$ (collectively, MMEs 114), and a Policy and Charging Rules Function (PCRF) 115. The eNodeBs 111 provide a radio access interface for UEs 102. The SGWs 112, PGW 113, MMEs 114, and PCRF 115, as well as other components which have been omitted for purposes of clarity, cooperate to provide an Evolved Packet Core (EPC) network supporting end-to-end service delivery using IP.

The eNodeBs 111 support communications for UEs 102. As depicted in FIG. 1, each eNodeB 111 supports a respective plurality of UEs 102. The communication between the eNodeBs 111 and the UEs 102 is supported using LTE-Uu interfaces associated with each of the UEs 102.

The SGWs 112 support communications for eNodeBs 111. As depicted in FIG. 1, SGW $112_1$ supports communications for eNodeB $111_1$ and SGW $112_2$ supports communications for eNodeB $111_2$. The communication between the SGWs 112 and the eNodeBs 111 is supported using respective S1-u interfaces. The S1-u interfaces support per-bearer user plane tunneling and inter-eNodeB path switching during handover.

The PGW 113 supports communications for the SGWs 112. The communication between PGW 113 and SGWs 112 is supported using respective S5/S8 interfaces. The S5 interfaces provide functions such as user plane tunneling and tunnel management for communications between PGW 113 and SGWs 112, SGW relocation due to UE mobility, and the like. The S8 interfaces, which may be Public Land Mobile Network (PLMN) variants of the S5 interfaces, provide inter-PLMN interfaces providing user and control plane connectivity between the SGW in the Visitor PLMN (VPLMN) and the PGW in the Home PLMN (HPLMN). The PGW 113 facilitates communications between LTE network 110 and IP networks 130 via an SGi interface.

The MMEs 114 provide mobility management functions in support of mobility of UEs 102. The MMEs 114 support the eNodeBs 111. The MME $114_1$ supports eNodeB $111_1$ and the MME $114_2$ supports eNodeB $111_2$. The communication between MMEs 114 and eNodeBs 111 is supported using respective S1-MME interfaces, which provide control plane protocols for communication between the MMEs 114 and the eNodeBs 111.

The PCRF 115 provides dynamic management capabilities by which the service provider may manage rules related to services provided via LTE network 110 and rules related to charging for services provided via LTE network 110.

As depicted in FIG. 1, elements of LTE network 110 communicate via interfaces between the elements. The interfaces described with respect to LTE network 110 also may be referred to as sessions.

The LTE network 110 includes an Evolved Packet System/Solution (EPS). In one embodiment, the EPS includes EPS nodes (e.g., eNodeBs 111, SGWs 112, PGW 113, MMEs 114, and PCRF 115) and EPS-related interconnectivity (e.g., the S* interfaces, the G* interfaces, and the like). The EPS-related interfaces may be referred to herein as EPS-related paths.

The IP networks 130 include one or more packet data networks via which UEs 102 may access content, services, and the like.

The MS 140 provides management functions for managing the LTE network 110. The MS 140 may communicate with LTE network 110 in any suitable manner. In one embodiment, for example, MS 140 may communicate with LTE network 110 via a communication path 141 which does not traverse IP networks 130. In one embodiment, for example, MS 140 may communicate with LTE network 110 via a communication path 142 which is supported by IP networks 130. The communication paths 141 and 142 may be implemented using any suitable communications capabilities.

The server 150 is connected to the IP networks 130 and is adapted to support streaming content sessions as discussed herein. The server 150 may store content locally or remotely via, illustratively, a mass storage device 160 in communication with the server 150.

Streaming Content to User Devices

Embodiments for streaming content from the server 150 to user devices 102 will now be described within the context of HTTP Adaptive Streaming (HAS), though other streaming media technologies may also be employed for this purpose as noted above. In particular, various embodiments are described herein as using Dynamic Adaptive Streaming over HTTP (DASH), which is a multimedia streaming technology currently being developed under the Moving Picture Experts Group (MPEG) and is generally discussed in 3GPP R10, ISO/IEC 23009-1:2012 and other documents, though other streaming technologies and protocols may also be employed within the context of the various embodiments.

Generally speaking, HAS embodiments utilize a HAS client on the UE 102 and a HAS server 150 in communication with the network 110. The server hosts multiple encodings of the same video content at different bitrate resolutions. Higher resolution yields better picture quality and requires more bandwidth. The content at each resolution is divided into small video segments (e.g., 2-5 seconds in length) so that the client can seamlessly switch the video bitrate resolution by requesting the next video segment from the server at a different bitrate (lower bitrate means smaller segment size for the same play duration and lower video quality).

DASH is an adaptive bitrate streaming technology where a multimedia file is partitioned into one or more segments and delivered to a client using HTTP. A media presentation description (MPD) describes segment information (timing, URL, media characteristics such as video resolution and bit rates, etc.). Segments can contain any media data, though specific guidance is provided for use with MPEG-4 file format or MPEG-2 Transport Stream.

In operation, the client begins by retrieving from the server a special manifest file (currently being standardized by 3GPP DASH) holding information about available bitrates, encodings, segments (e.g., ID, duration) and specifics on how to request the content. The client maintains a fixed size cache buffer (ranging typically from 20 sec to 5 min, where different HAS clients use different preset sizes) aimed at smoothing the user experience. It is noted that buffering from a few seconds to many minutes may be used and that such ranges are not a limiting factor with respect to the various embodiments. The client's Rate Determination Algorithm (RDA) selects the bitrate for each subsequent segment (or group of segments) it requests from the server. It accomplishes this by utilizing some preset logic, heuristics and thresholds along with historic data for buffer fullness and estimated available throughput bandwidth for received segments.

Figure 2:
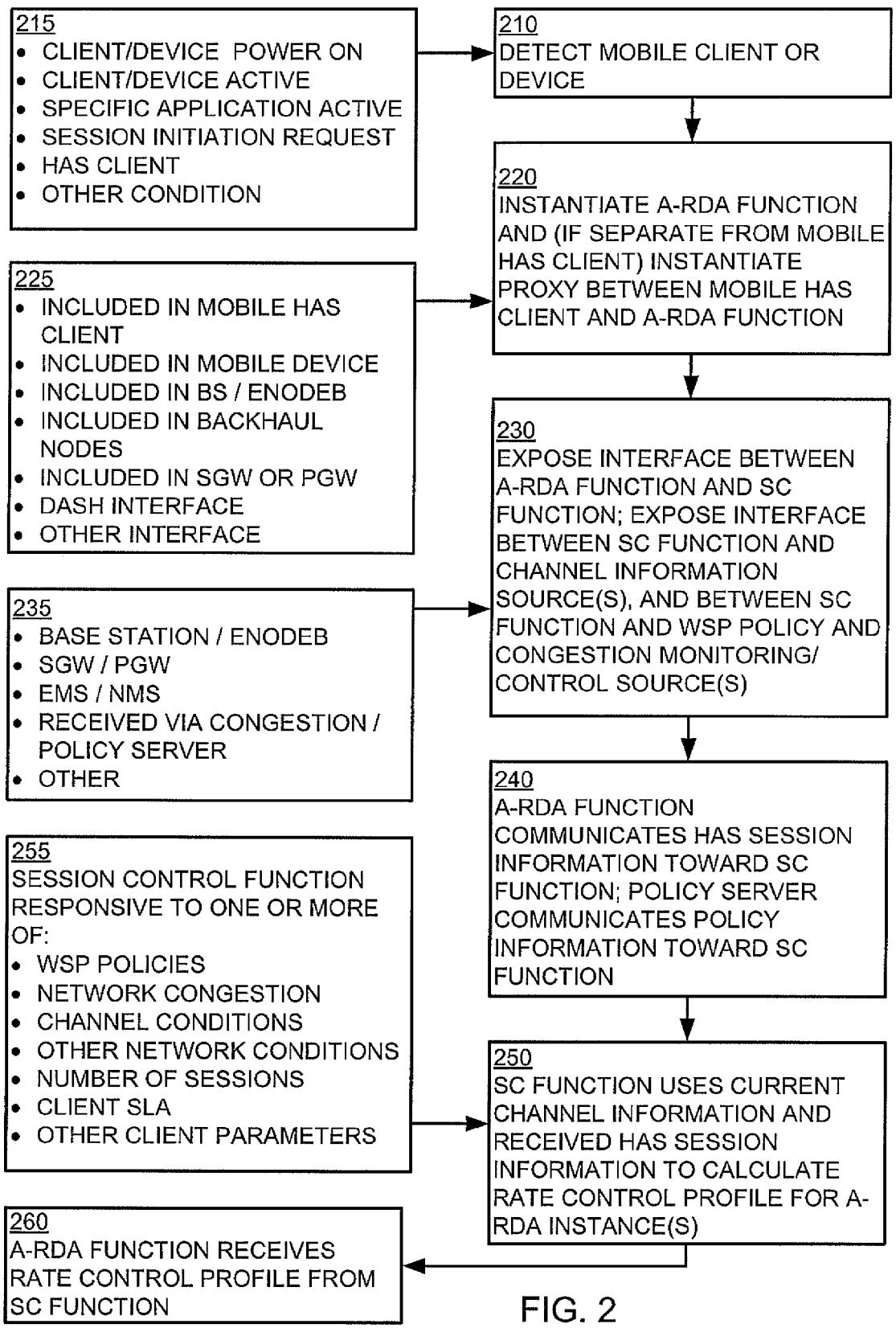
FIGS. 2-4 depict flow diagrams of methods according to various embodiments.

FIG. 2 depicts a flow diagram of a method according to an embodiment. Specifically, FIG. 2 depicts a method 200 for distributing a rate control profile from a Wireless Service Provider (WSP) access network session control (SC) function to an A-RDA function. In particular, the method FIG. 2 contemplates establishing and utilizing an Adaptive Rate Determination Algorithm (A-RDA) and, optionally, a proxy function in which client/server communications are intercepted and modified such that content streaming is provided in a manner consistent with Wireless Service Provider (WSP) policies.

At step 210, a mobile client or mobile device (or non-mobile client or device) is detected. Referring to box 215, such detection may be in response to a client or device power on condition, a client or device entering an active state, a specific application or application programming interface (API) on the client or device entering an active state (e.g., video streaming application or related API), an HTTP Adaptive Streaming (HAS) client becoming active or some other condition.

At step 220, an A-RDA function is instantiated and, if the A-RDA function is separate from a mobile HAS client, a proxy function is instantiated between the A-RDA function and the mobile HAS client. Referring to box 225, the A-RDA function may be included within a mobile HAS client, included within a mobile device, included in a base station or eNodeB, included in a back haul node such as a Service Gateway (SGW) or Packet Gateway (PGW) or some other location or node within a WSP access network. The proxy function illustratively uses the DASH interface or some other interface to intercept communications between, illustratively, the mobile client and remote server (such as a HAS client operative within the mobile device to receive streaming content from a HAS server).

The proxy function, if used, is instantiated in some location logically disposed between the video client and server, as will be discussed in more detail below with respect to FIG. 5. The proxy function operates to intercept DASH-compliant communications from either the client device or server, and subsequently provide DASH-compliant communications to the server or client device. For example, the intercepted communications may be modified such that bitrate changes according to the various embodiments are implemented.

At step 230, an interface between the A-RDA function and Wireless Service Provider (WSP) access network session control (SC) function (e.g., HAS Session Control Function) is exposed so that the A-RDA function may receive commands from, and otherwise communicate with, the SC function. Additionally, an interface between the SC function and a mobile device channel information source, and between the SC function and WSP network policy and congestion information servers is exposed so that the SC function may receive channel condition information such as available channel bandwidth, instantaneous and/or expected channel and access network congestion levels, bandwidth allocation policy for specific end users and applications and the like. Referring to box 235, the channel information source may comprise a base station, eNodeB, SGW, PGW or other back haul node, Congestion monitoring servers, Home Subscriber Servers (HSS) or Authentication, Authorization and Accounting (AAA) servers, Element Management System (EMS), A Network Management System (NMS) and the like. In various embodiments, the SC function may receive information from a Congestion or Policy Server.

At step 240, the A-RDA function communicates HAS session information toward the SC function. The HAS session information may be associated with one or more mobile clients within a service area. The HAS session information from A-RDA may consist of available bitrates for this user, current rate control profile, and other information sent by the HAS client in the CCD request according to DASH standard, as well as session start/stop/pause events. In addition, information related to Wireless Service Provider (WSP) policies, client service level agreements (SLAB) and other WSP or network management interests may be communicated to the SC from HSS or AAA servers or other policy servers.

At step 250, the SC function uses current information from a channel information source and the received HAS session information from all HAS clients to calculate or recalculate the rate control profile for the individual A-RDA function instances. Optionally, the HAS Session Control calculates or recalculates the rate control profiles for other active A-RDA functions as appropriate, depending upon WSP conditions, network management considerations and so on.

The SC function may optionally correlate generation of rate control profile, providing guidance to the A-RDA function, with appropriate Quality of Service (QoS) allocation via PCRF or other mechanisms with respect to the mobile client (s) or application(s) utilizing the available channel.

Referring to box 255, the session control function adapts rate control profiles according to one or more of wireless service provider (WSP) policies, network congestion, channel conditions or other network conditions for individual UEs, a number and throughput needs of active HAS and other sessions, a service level agreement (SLA) associated with the client and/or other client or network related parameters or conditions.

At step 260, the A-RDA function receives the rate control profile from the SC function.

It is noted that steps 240-260 may be repeated whenever session or channel conditions change (e.g., a new HAS session started or a HAS session stopped, channel conditions for one or more mobiles change, congestion level changes, and so on). Similarly, steps 250-260 may also be repeated in response to changes in conditions or assumptions associated with WSP policies, SLAs and the like.

Generally speaking, the rate control profile provides information defined by the WSP operator or other entity that is intended to guide or control content segment selection and/or rate determination decisions made by the A-RDA function associated with a client. Since decisions made by the A-RDA function associated with a client override or otherwise control local client RDA functions, the rate control profile thereby operates to control client bandwidth utilization. A-RDA function makes various determinations based upon existing channel conditions and the like in a manner consistent with its corresponding rate control profile.

In various embodiments, the rate control profile defines one or more parameters such as heuristics settings, bandwidth usage thresholds levels, buffer usage threshold levels, desired buffer levels and so on associated with a particular client device. Parameters may include one or more of various thresholds, heuristics, client cache buffer size, A-RDA function cache buffer size, client cache buffer fill policy, A-RDA function cache buffer fill policy and so on. The various parameters may also be adapted based upon operating modes associated with the client and/or its corresponding A-RDA function. For example, parameters may be adapted based upon whether or not a mobile device/client is near a cellular region edge (wide signal/quality variations) or near a cellular region center (few signal/quality variations). Parameters may be adapted based upon whether or not congestion exists or is expected. Parameters may be adjusted based upon whether or not a particular client has subscribed to a gold level of service, a silver level of service or bronze level of service, where each level of service denotes a respective set of quality of service (QoS) classes.

Figure 3:
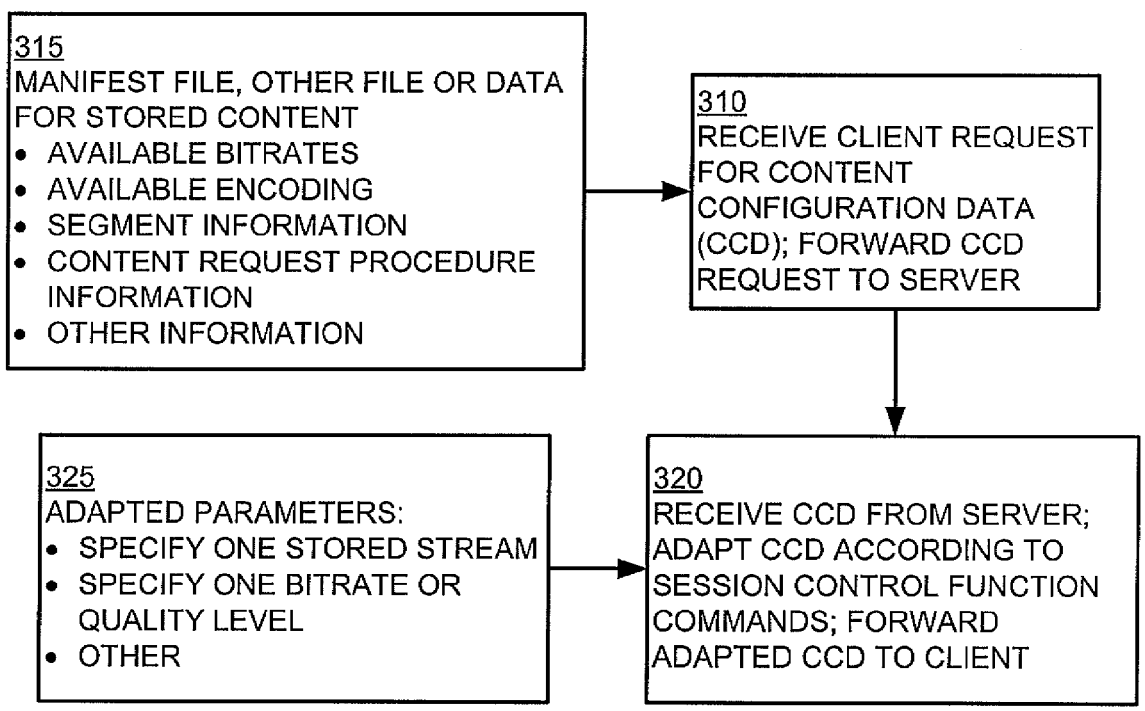

FIG. 3 depicts a flow diagram of a method according to an embodiment. Specifically, FIG. 3 depicts a method 300 in which communications intercepted by a proxy function are modified prior to being forwarded to a client or server, such as communications requesting and/or delivering manifests (CCD) associated with desired streaming media or other content.

At step 310, a client request for content configuration data (CCD) associated with desired content (e.g., video programming, movies, television programming and the like) is received at the proxy from the client and forwarded by the proxy to an appropriate server. The request for content configuration data may comprise, illustratively, a request for a manifest file or other file or data associated with desired content, depending upon the streaming protocol used. Referring to box 315, the requested CCD, manifest file or other data to be provided by the server to the client may include available bitrates, available encoding, segment information (identification, size and so on), content request procedure information and/or other information associated with the desired content itself or the delivery of such content.

At step 320, the CCD, manifest file or other data to be provided by the server to the client is received at the proxy from the server, modified if necessary, and forwarded by the proxy to the requesting client. Referring to box 325, adapted parameters within the CCD may comprise indicating the storage at the server of one stored stream, a stored stream of one particular bitrate or quality level and so on. Upon receiving the CCD, the client is able to initiate a session with the server to receive therefrom the desired content.

The method 300 of FIG. 3 modifies the CCD such that only a single stream or segment selection may be made by a mobile client. In this manner, the mobile HAS client RDA is effectively disabled. There is no need or ability of the mobile client to select a next content segment from among a plurality of choices, therefore there is no need for operation of a mobile client rate determination algorithm (RDA) to make such a selection.

In various embodiments, all Rate Selection decisions are delegated to the A-RDA proxy, which enforces such decisions by leaving for client selection only a single available bit rate for content/video in the CCD. The HAS client can only request the content/video segment at whatever bit rate is known or otherwise made available to the client, which knowledge and availability are controlled/selected by the A-RDA proxy based upon the throughput information/measurements the A-RDA function is utilizing and the corresponding A-RDA rate control profile.

Thus, the proxy and A-RDA functions cooperate to intercept and modify communications between the client and server in the manner adapted to cause an increase or decrease in bandwidth demand by the client while optimizing user quality of experience. In various embodiments, the A-RDA function selects the bitrate for each subsequent segment (or group of segments) it requests from the server.

Generally speaking, the A-RDA and corresponding proxy function operates independently of the HAS client to make rate selection decisions on behalf of the HAS client. Such decisions may be made by the A-RDA proxy at the time the A-RDA proxy requests a next content or video segment from the HAS server, which is stored in the A-RDA proxy cache when received. Therefore, regardless of the specific segment requested by the HAS client, the A-RDA proxy supplies the HAS client with the corresponding segment from the A-RDA proxy cache.

Figure 4:
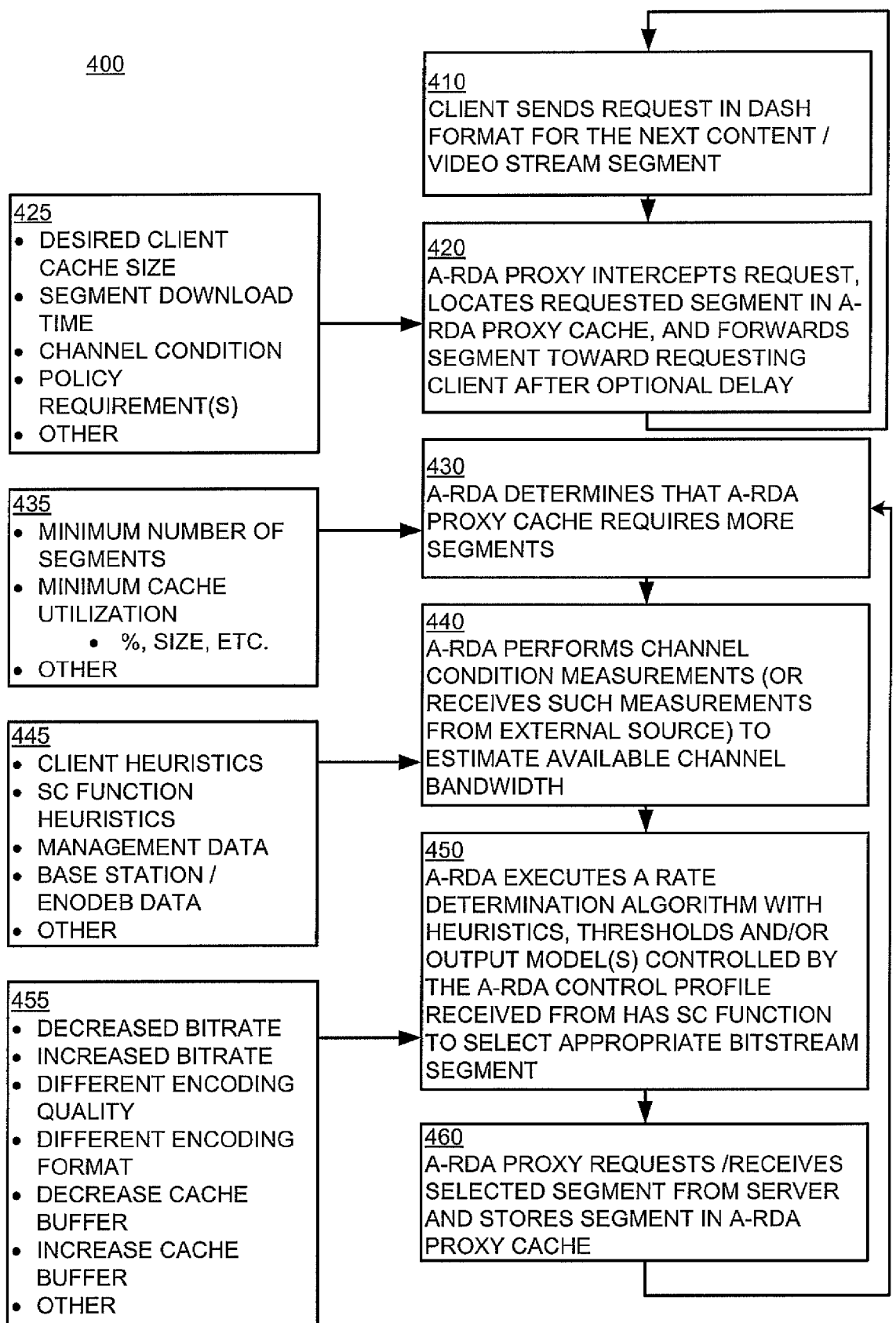

FIG. 4 depicts a flow diagram of a method according to an embodiment. Specifically, FIG. 4 depicts a method for requesting and delivering subsequent content/video segment during a play or streaming operation.

The method 400 of FIG. 4 contemplates two independent operations performed by an A-RDA proxy. In a first or client facing operation (steps 410-425), the A-RDA proxy interacts with a client to satisfy client requests for subsequent content/video segments. In a second or server facing operation (steps 430-460), the A-RDA proxy interacts with a server to retrieve appropriate next content/video segments from the server, which content/video segment are then stored at a local A-RDA proxy cache.

Providing Requested Segments to Client from A-RDA Proxy Cache

At step 410, the client sends a request in DASH format for a next content/video segment. For example, the client sends a request to a server for a next content/video segment stored at the server based upon the single stored stream or bitrate known to the client from the CCD information described above with respect to FIG. 3.

At step 420, the A-RDA proxy intercepts the request, finds the requested segment in its cache, and forwards the segment toward the requesting client after an optional delay. Referring to box 425, the optional delay is determined based upon one or more of a desired client cache size, a segment download time, a channel condition parameter, a policy requirement or some other factor. The A-RDA proxy in the first operation then waits for the next client request. As discussed herein, by implementing a delay in forwarding requested content/video segments to the client, the number of segments stored by the client is controlled, thereby controlling the size of the cache buffer used by the client to store content/video segments. The size of the client cache buffer to maintain as well as the delay may be part of the Rate Control Profile policy. The delay may be calculated by, illustratively, taking into account play duration of the segments, maximal and current client buffer size, various thresholds for client buffer fullness and so on All of these parameters (except play duration) may be controlled by the Rate Control Profile.

Requesting Segments from Server to Keep A-RDA Proxy Cache Current

To ensure that the A-RDA proxy cache includes sufficient and appropriate content/video segments to satisfy client requests (e.g., per steps 410-425), the A-RDA proxy requests sufficient next content/video segments from the server to build the A-RDA proxy cache associated with the content/video being streamed, viewed or otherwise presented at the client.

At step 430, the A-RDA function determines that the A-RDA proxy cache requires more content/video segments. This determination may be made with respect to a received rate control profile specifying parameters such as cache size, timing policy to fill the cache, minimum number of segments remaining in the A-RDA proxy cache, a minimum cache utilization level being reached (e.g., minimum percentage and/or minimum size), or some other means for determining that an underflow condition may become possible.

In various embodiments, the cache size and the rate at which to fill the cache may be controlled via parameters within a rate profile provided to the A-RDA function via the SC function. In one embodiment, the rate at which an A-RDA cache is to be filled may be controlled via time delays between a previous segment being downloaded and the next segment request being sent. Such delays may be subject to various buffer fullness level thresholds, which may be defined in rate control policy received from the SC.

At step 440, the A-RDA measures various channel conditions, bandwidth throughput to the client and/or other parameters (or receives such measurements from an external source) to estimate thereby available channel bandwidth. Referring to box 445, mobile channel conditions and client bandwidth throughput may be determined via direct measurements, client controlled heuristics, SC function controlled heuristics or other heuristics. Instantaneous and/or expected mobile channel conditions may also be provided via available management information, base station or eNodeB information or other sources.

At step 450, the A-RDA function executes a Rate Determination Algorithm using historic measurement results from Step 445 and heuristics, thresholds and/or output model(s) specified or otherwise controlled by the A-RDA rate control profile previously received from HAS SC function to select thereby appropriate next content/video segments. The next content/video segments comprise segments of an available bitstream (such as indicated by the previously received CCD) the most closely correlates to be determined with desired bit rate. Referring to box 455, the appropriate next content/video segment may have different characteristics than previously selected segments, such as having a decreased bit rate, and increased bit rate, a different encoding quality, a different encoding format and/or adapting other client-related parameters in a manner tending to be consistent with the rate control profile and channel conditions. For example, the appropriate segments may be selected to increase or decrease client cache buffer size due to segment size and/or delay in client forwarding.

At step 460, the proxy requests the next content/video segment with the selected by A-RDA function from the server, receives the content/video segment from the server, and stores the received segment in the A-RDA proxy cache.

Generally speaking, the various A-RDA and SC functions described herein operate to dynamically tune parameters impacting bitrate selection to current channel and network conditions rather than preset parameters. This dynamic tuning of thresholds, heuristics, buffer size and/or other parameters is provided via A-RDA session control and/or rate control profile parameters that are dynamically received by A-RDA from HAS Session control in response to changes in channel and/or network condition.

Constraining Client Cache Buffer Size

As previously noted, such as with respect to step 420 of the method 400 of FIG. 4, a delay in forwarding requested content/video segments to the client may be implemented to control client cache buffer size. Generally speaking, client applications attempt to build a relatively large cache buffer so that receive streaming content may be smoothly displayed to user. However, if a large amount of content is stored within the client cache buffer and the user selects a different client stream or stops streaming altogether than the bandwidth associated with filling that buffer has been wasted. Therefore, various embodiments operate to control client cache buffer size to more efficiently use available wireless network resources.

Thus, in various embodiments, rather than allowing a client to build a large cache, the A-RDA function and SC function operate to limit the client cache to a predefined number of segments, a predefined size, the predefined amount of content and so on. For example, assuming that a client cache is to be limited to, illustratively, eight content/video segments, the optional delay discussed above with respect to step 420 is calculated to forward new content/video segment to the client in a manner tending to constrain the desired eight content/video segment.

An appropriate delay time for client cache size management may be calculated using one or more of the playtime of content/video segments, the instantaneous or average or expected download time of content/video segments, a predefined delay time and so on. This information may be derived from the WSP or any of its operational elements/routers, information within the rate control profile, empirically derived information from the client, A-RDA function and/or SC function and so on.

Figure 5A:
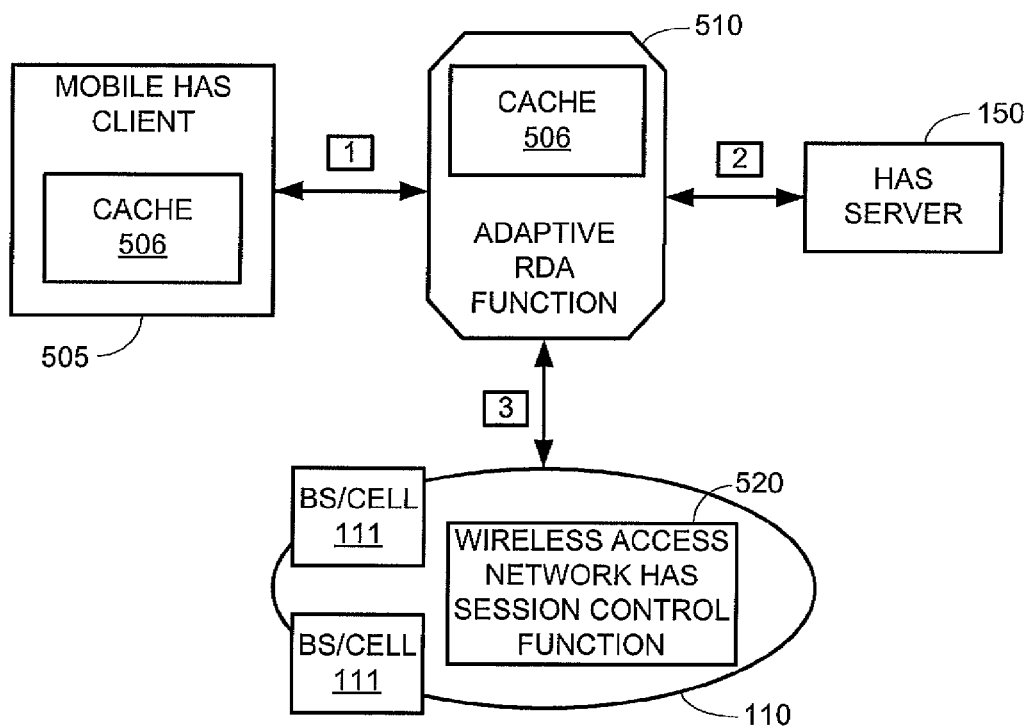
FIGS. 5A-5E depict high level block diagrams of various embodiments.

FIGS. 5A-5E graphically depict various embodiments of an A-RDA function and proxy function. In particular, the various embodiments depicted show different placements of the A-RDA function discussed herein. The elements specifically referenced in the below discussion of the embodiments of FIG. 5A are generally common to each of FIGS. 5A-5E and, as such, will not be specifically referenced again in FIGS. 5B-5E.

FIG. 5A depicts a generic embodiment of an A-RDA function and proxy function. In particular, a mobile client 505 such as a mobile HAS client communicates with a server 150 such as a HAS server via an A-RDA function 510. The A-RDA function 510 cooperates with a wireless access network session control function 520 to control streaming of content to the client in the manner described herein.

Figure 5B:
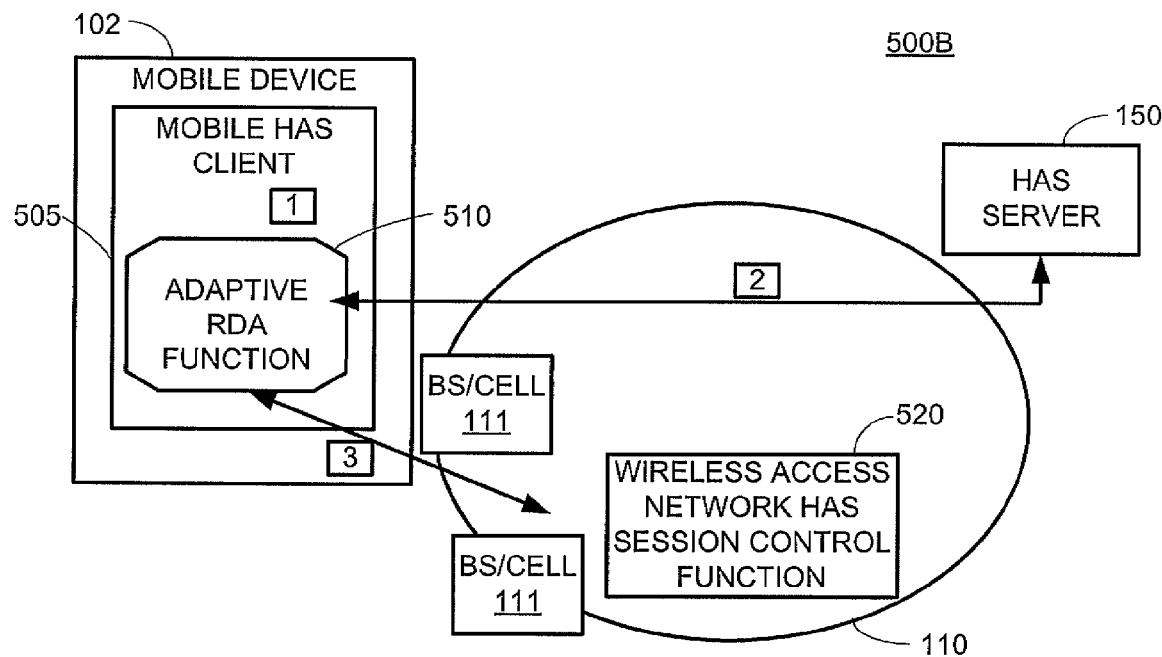
Figure 5C:
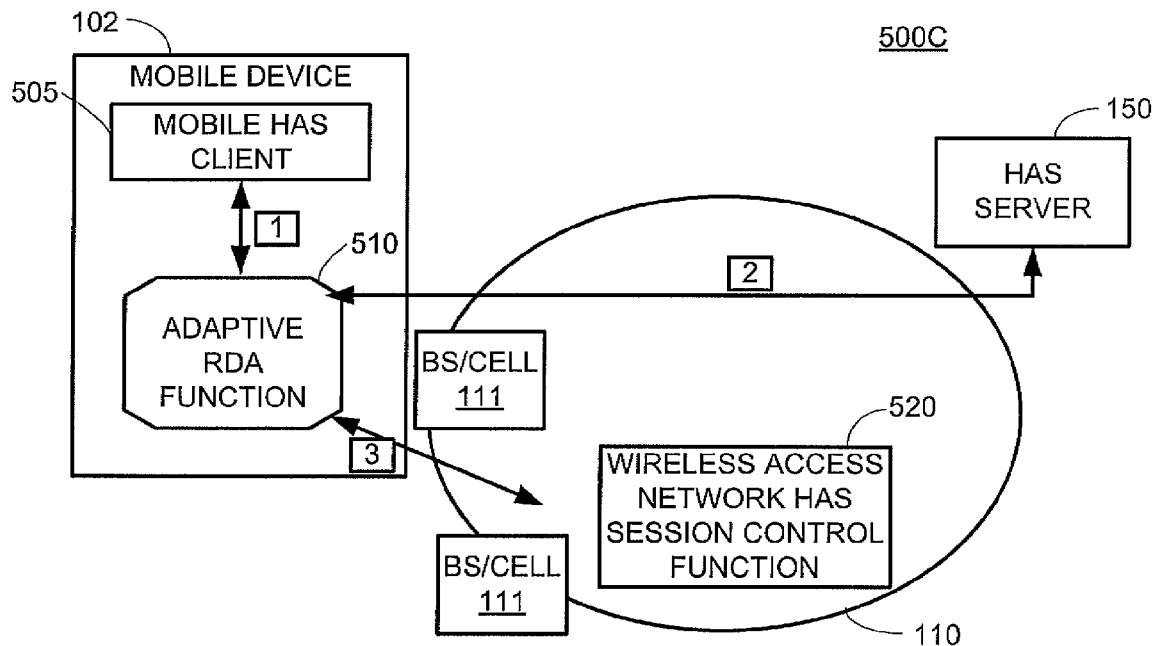
Figure 5D:
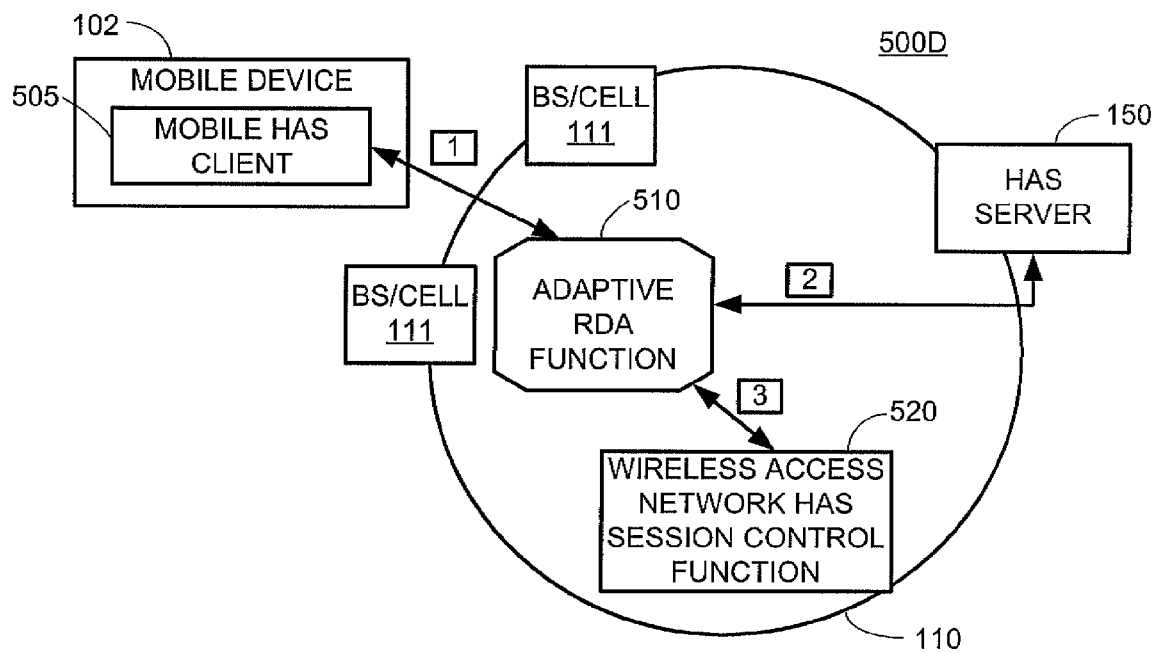

FIG. 5A depicts the mobile client 505 as including a cache buffer 506, and the A-RDA function as including a cache buffer 511. The client cache buffer 506 and A-RDA function/A-RDA proxy function cache buffer 511 operates in the manner described above with respect the various figures. While not shown in FIGS. 5B-5D, is noted that these cache buffers are also present in the embodiments discussed below with respect to FIGS. 5B-5D. With respect to the embodiment of FIG. 5B (where the A-RDA function is included with a part of the mobile client), only one of the caches is needed.

Referring to FIG. 5A, the A-RDA function 510 communicates with the mobile client 505 via a first interface, the HAS server 150 via a second interface, and the wireless access network session control function 520 via a third interface. It is noted that the wireless access network session control function 520 is located within a wireless network 110, which network includes a plurality of base stations or eNodeBs 111.

Generally speaking, and as further described herein with respect to the various embodiments, at the beginning of a HAS session the A-RDA function acts as a HTTP Proxy and intercepts the DASH compliant request that the HAS client sends to the HAS server for the Manifest file (CCD) (over the first interface (1)). The A-RDA function then establishes an HTTP session with the HAS server over the second interface (2), and obtains the Manifest file (CCD) for the Video content that the HAS client asked for with available different bitrates. The A-RDA then substitutes the original Manifest file with the DASH compliant "pseudo" manifest file (CCD), where only a single bitrate is specified as available, and forwards this "pseudo" manifest file (CCD) to the Mobile HAS client. This effectively disables the native RDA in the Mobile HAS client, since it is only aware of a single available bitrate without additional selection choices.

The Wireless Service Provider's HAS Session Control function (located within the WSP's network) dynamically adjusts A-RDA policy/controls/parameters over interface (3) in order to optimize the RDA's bitrate selection based upon WSP policy, network congestion state, channel conditions, and other available network information.

In one embodiment, the A-RDA acting as a HAS client uses the dynamically adjusted policy parameters together with additional measured throughput and policy controlled heuristics to select the optimal bitrate for the next video segment. The A-RDA requests the video segment with the selected bitrate from the HAS server and caches it locally. The A-RDA intercepts the HAS client request for the next video segment, ignores the requested bitrate, and sends back to the HAS client the corresponding cached video segment (with the bitrate selected by the A-RDA earlier).

In one embodiment, the A-RDA maintains its own video cache with the cache size dynamically controlled by the WSP policy via interface (3). To prevent the Mobile HAS client from building its own video cache in addition to the A-RDA cache, the A-RDA introduces a delay between the receiving of the HAS client request and the sending of the video segment in response. Example of such delay could be weighted difference between requested video segment playtime and the time it took to download the video segment from the HAS server.

FIG. 5B depicts an A-RDA function wherein the A-RDA function is embedded in a mobile client 505. The interface (1) is internal to the HAS client (no proxy needed). HAS client implements and exposes the interface (3) for WSP control of the Adaptive RDA function. Note that the interface (3) might be also implemented via intermediate WSP agent at the Mobile Client.

FIG. 5C depicts an A-RDA function and proxy function wherein the A-RDA function is a WSP-administered and controlled application on the mobile client 505. In this embodiment, the first interface (1) is local to the client and the third interface (3) is between the A-RDA application and the WSP Access Network. The HAS Session Control function can be either on a serving or at an access Controller (e.g. P-GW) level. The A-RDA function calculates throughput by measuring the download time of each video segment (similar to legacy RDA) that it requests from the HAS server.

FIG. 5D depicts an A-RDA function and proxy function wherein the A-RDA function is located proximate the cell control function (e.g., 3G Base Station, LTE eNodeB and the like). The interface (3) is internal to the WSP Access Network. The HAS Session Control function can be either collocated with A-RDA on a serving cell or at the Access Controller (e.g. P-GW) level. The A-RDA function calculates throughput by measuring the download time of each video segment (similar to legacy RDA) over the wireless link (this information is available at the eNodeB) plus the measured download time of the video segment from the HAS server to the eNodeB.

Figure 5E:
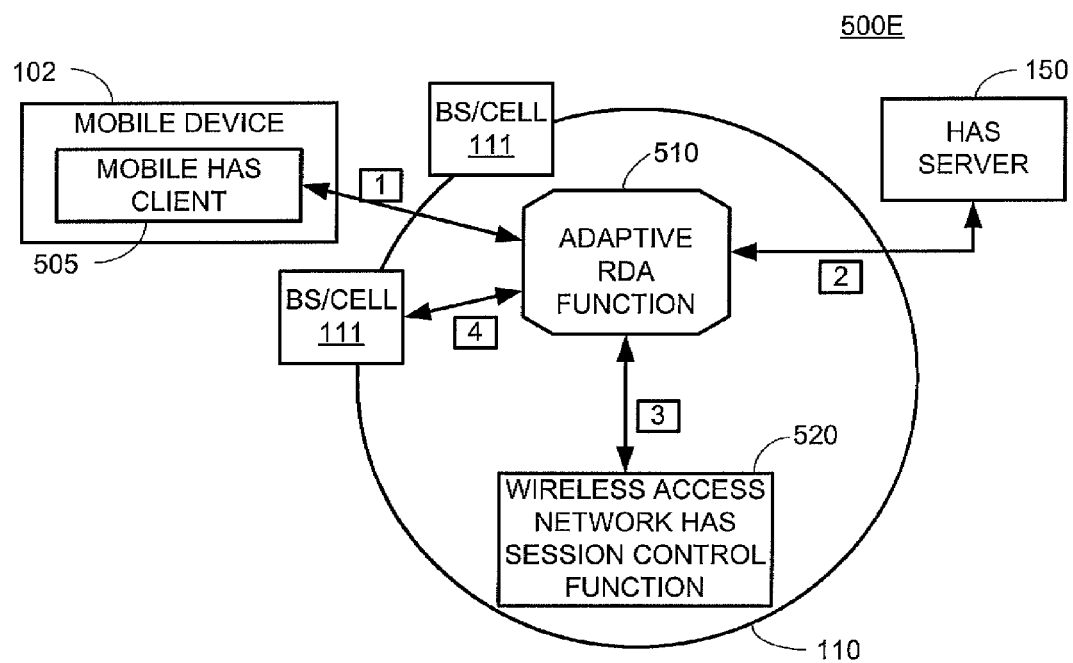

FIG. 5E depicts an A-RDA function and proxy function wherein the A-RDA function is located above the eNodeB level (e.g., hierarchically at or above a SGW or PGW in an LTE wireless network 110). The interface (3) is internal to WSP Access Network. HAS Session Control function is collocated with A-RDA. The A-RDA function calculates throughput by obtaining the measured download time over wireless link of each video segment from the serving eNodeB (added interface (4) with added measured download time of the video segment from the HAS server to eNodeB).

Figure 6:
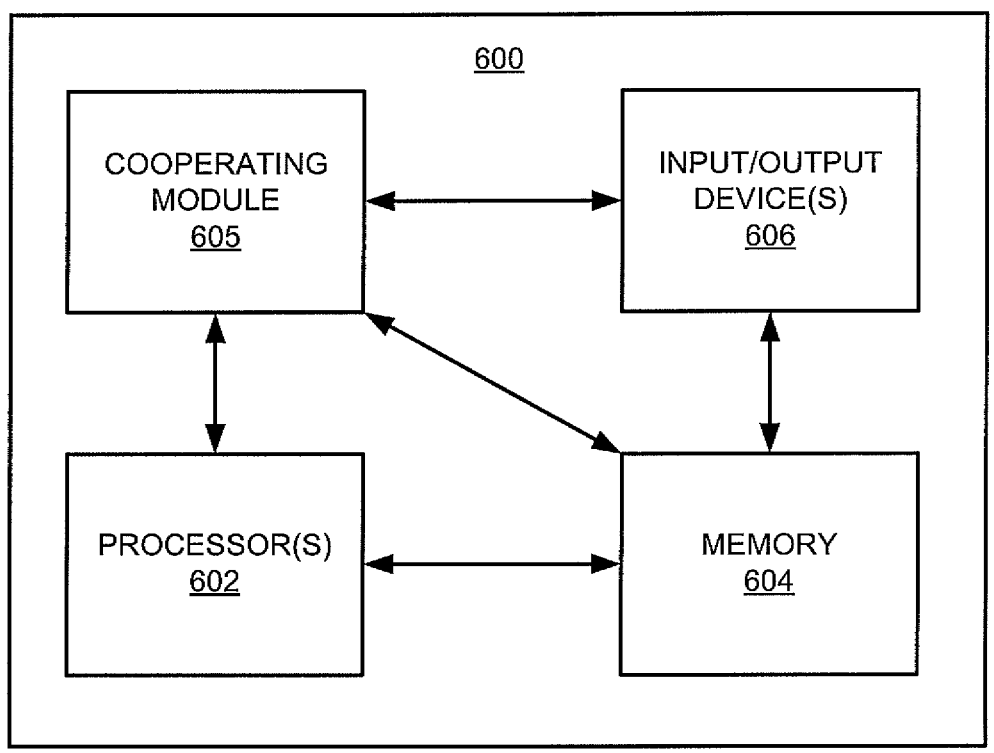
FIG. 6 depicts a high-level block diagram of a computer suitable for use in performing the functions described herein.

FIG. 6 depicts a high-level block diagram of a computer suitable for use in performing functions described herein.

As depicted in FIG. 6, computer 600 includes a processor element 603 (e.g., a central processing unit (CPU) and/or other suitable processor(s)), a memory 604 (e.g., random access memory (RAM), read only memory (ROM), and the like), a cooperating module/process 605, and various input/output devices 606 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software and/or in a combination of software and hardware, e.g., using a general purpose computer, one or more application specific integrated circuits (ASIC), and/or any other hardware equivalents. In one embodiment, the cooperating process 605 can be loaded into memory 604 and executed by processor 603 to implement the functions as discussed herein. Thus, cooperating process 605 (including associated data structures) can be stored on a computer readable storage medium, e.g., RAM memory, magnetic or optical drive or diskette, and the like.

It will be appreciated that computer 600 depicted in FIG. 6 provides a general architecture and functionality suitable for implementing functional elements described herein or portions of the functional elements described herein.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible and non-transitory computer readable medium such as fixed or removable media or memory, transmitted via a tangible or intangible data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for controlling client bandwidth usage, comprising:
   instantiating an adaptive rate determining algorithm (A-RDA) function associated with a mobile client, said A-RDA function being responsive to a rate control profile and to client channel information including at least wireless channel condition information to select for said client available content segments having an appropriate bitrate to control said client bandwidth usage.

2. The method of claim 1, wherein a proxy function of said A-RDA function adapts client requested content configuration data (CCD) to indicate availability of only a single content stream.

3. The method of claim 1, wherein said A-RDA proxy function delays forwarding content segments toward said client in a manner adapted to constrain a size of a client cache buffer.

4. The method of claim 3, wherein said delay is determined using information from said rate control profile.

5. The method of claim 3, further comprising:
   said A-RDA proxy function requesting content segments from a server at a bitrate calculated using the rate control profile and client channel information, wherein content segments received from said server are stored in an A-RDA proxy function cache memory.

6. The method of claim 1, wherein said A-RDA function is instantiated in response to detection of one or more of a mobile device active state, a mobile client active state, a specific mobile device application active state and a session initiation request.

7. The method of claim 1, wherein said rate control profile is generated by a Wireless Service Provider (WSP) access network session control (SC) function.

8. The method of claim 7, wherein said SC function generates said rate control profile in response to channel information and session information associated with said mobile client.

9. The method of claim 8, wherein said session information is associated with a plurality of mobile clients within a service area.

10. The method of claim 9, wherein said session information is related to one or more of Wireless Service Provider (WSP) policies and client service level agreements (SLAs).

11. The method of claim 1, wherein said A-RDA function is instantiated at any of a client device, a base station, a router and a node within a Wireless Service Provider (WSP) access network.

12. The method of claim 1, wherein said A-RDA function is instantiated as part of a client application at a client device.

13. The method of claim 8, wherein said A-RDA and SC functions operate to dynamically tune parameters impacting client content segment bitrate selection in response to current channel conditions and one or more of Wireless Service Provider (WSP) policies and client service level agreements (SLAs).

14. The method of claim 9, wherein said parameters comprise one or more of thresholds, heuristics, client cache buffer size, A-RDA function cache buffer size, client buffer fill policy and A-RDA function buffer fill policy.

15. The method of claim 1, wherein said A-RDA function has associated with a respective cache buffer for storing content segments received from a server prior to forwarding said content segments to the client.

16. The method of claim 15, wherein each of a plurality of mobile clients has associated with a respective A-RDA function.

17. The method of claim 1, wherein the wireless channel condition information includes one or more of an available wireless channel bandwidth, instantaneous or expected wireless channel and access network congestion levels, bandwidth allocation policy for specific wireless end users and applications.

18. An apparatus for controlling client bandwidth usage in a wireless network supporting content streaming to client devices, the apparatus comprising:

a processor configured for:

instantiating an adaptive rate determining algorithm (A-RDA) function associated with a mobile client, said A-RDA function being responsive to a rate control profile and to client channel information including at least wireless channel condition information to select for said client available content segments having an appropriate bitrate to control said client bandwidth usage.

19. The apparatus of claim 18, wherein said apparatus is associated with any of a client device, a base station, a router and a node within a Wireless Service Provider (WSP) access network.

20. The apparatus of claim 18, wherein said rate control profile is associated with a plurality of mobile clients within a service area.

21. A non-transitory computer readable storage medium storing instructions which, when executed by a computer, cause the computer to perform a method for constraining client bandwidth usage, comprising:

instantiating an adaptive rate determining algorithm (A-RDA) function associated with a mobile client, said A-RDA function being responsive to a rate control profile and to client channel information including at least wireless channel condition information to select for said client available content segments having an appropriate bitrate to control said client bandwidth usage.

22. A non-transitory computer program product wherein computer instructions stored in a non-transitory computer readable memory, when processed by a computer, adapt the operation of the computer to provide a method for constraining client bandwidth usage, comprising:

instantiating an adaptive rate determining algorithm (A-RDA) function associated with a mobile client, said A-RDA function being responsive to a rate control profile and to client channel information including at least wireless channel condition information to select for said client available content segments having an appropriate bitrate to control said client bandwidth usage.

* * * * *